United States Patent [19]
Valois et al.

[11] 3,759,389
[45] Sept. 18, 1973

[54] FILTER ASSEMBLY FOR SWIMMING POOLS

[75] Inventors: Marcel Valois; Kenneth Valois, both of Laval Sur Le Lac, Quebec, Canada

[73] Assignee: Valmar Swimming Pools Ltd., Quebec, Canada

[22] Filed: Apr. 13, 1971

[21] Appl. No.: 133,630

[30] Foreign Application Priority Data
Apr. 8, 1971 Canada .............................. 110,047

[52] U.S. Cl. ............................................... 210/169
[51] Int. Cl. ................................................ E04h 3/20
[58] Field of Search ..................................... 210/169

[56] References Cited
UNITED STATES PATENTS
| | | | |
|---|---|---|---|
| 2,900,079 | 8/1959 | Pace ................................. | 210/169 |
| 3,036,712 | 5/1962 | Barbara ............................ | 210/169 |
| 3,168,470 | 2/1965 | Rhoda .............................. | 210/169 |
| 3,067,879 | 12/1962 | Baker ............................... | 210/169 |
| 3,622,001 | 11/1971 | Oden ................................ | 210/169 |
| 3,653,513 | 4/1972 | Ortega et al. .................... | 210/169 |

Primary Examiner—Charles N. Hart
Attorney—Raymond A. Robic

[57] ABSTRACT

A filter assembly for swimming pool made of wall segments assembled edge to edge to form the wall of the pool. The filter assembly comprises a casing integral with one of the wall segments and located on the outside wall of the segment, a filter chamber in the casing and communicating with the pool interior adjacent the surface of the water in the pool, a filter located in the filter chamber, and a pump located in the casing outside the filter chamber and communicating with the filter and with the pool interior adjacent the bottom thereof for recirculating the water in the pool from the top of the pool through the filter and towards the bottom of the pool.

6 Claims, 3 Drawing Figures

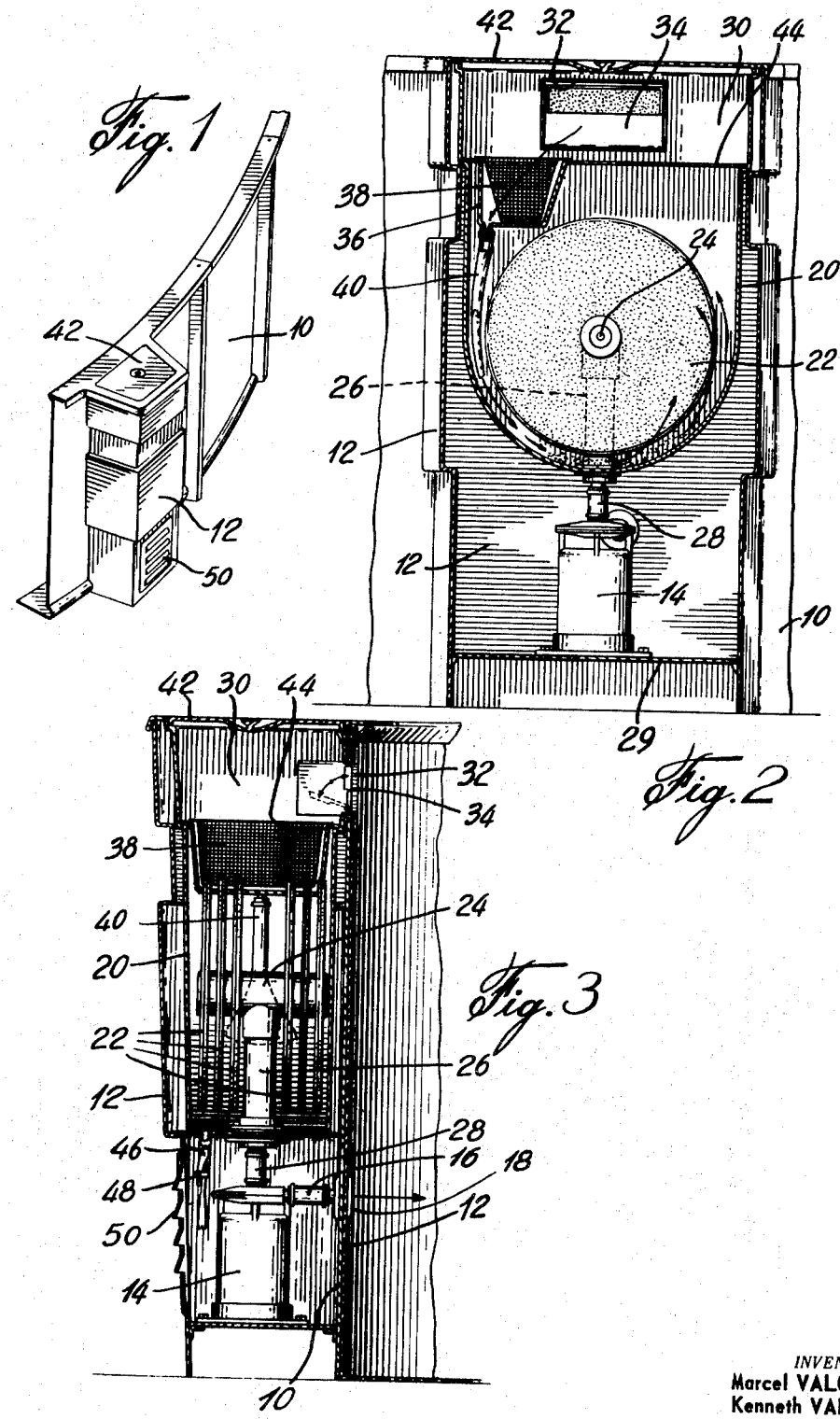

FILTER ASSEMBLY FOR SWIMMING POOLS

This invention relates to a filter assembly for a swimming pool and is particularly concerned with above ground collapsable swimming pools made of a plurality of wall segments joined together edge to edge to make up the wall of the pool.

Various filter assemblies are known for swimming pools. However, such assemblies normally consist of separate units which are placed beside the pool. They must therefore be installed separately and require extra labour.

It is the main object of the invention to provide a filter assembly which is integral with one of the wall segments of the pool, thereby eliminating the extra labour normally required to install a separate filter assembly.

The filter assembly, in accordance with the invention, comprises a casing integral with one of the segments and located on the outside wall of the one segment, a filter chamber in the casing and communicating with the pool interior adjacent to the surface of the water in the pool, a filter located in the filter chamber, and a pump located in the casing outside the filter chamber and communicating with the filter and with the pool interior adjacent the bottom thereof for recirculating the water in the pool from the top of the pool, through the filter and towards the bottom of the pool.

A second chamber is provided in the casing on top of the filter chamber and is connected directly to the pool through an opening in the wall segment. Such second chamber contains a basket filter for collecting the coarse material in the pool.

It is a second feature of the present invention to prevent the filter powder which is regularly fed into the filter chamber from depositing itself at the bottom of the filter chamber.

In accordance with such second feature of the invention, the above-mentioned second chamber is provided with a depression into which the basket filter is placed, and a conduit in communication with such depression is extended into the filter chamber for creating a turbulence flow in the filter chamber to prevent the filter powder from depositing itself at the bottom of the filter casing. Such arrangement causes the filter powder to be sucked in towards the filter discs of the filter.

The second chamber is separated from the filter chamber by a removable plate permitting access to the filter chamber.

The pump is located below the filter chamber in the casing and is provided with a removable door giving access to the pump.

The invention will now be disclosed with reference to a preferred embodiment thereof and to the accompanying drawings in which :

FIG. 1 illustrates a perspective view of a portion of a swimming pool wherein one of the wall segments comprises a pump and filter casing ;

FIG. 2 illustrates a vertical section of the pump and filter casing; and

FIG. 3 illustrates a vertical cross-section of the pump and filter casing.

Referring to FIG. 1, there is shown a portion of a swimming pool made of a number of wall segments 10 assembled together edge to edge. One of the wall segments comprises a pump and filter casing 12 integral therewith.

As illustrated in FIGS. 2 and 3, the filter casing 12 contains a recirculating pump 14 having an outlet 16 leading to the pool interior through an opening 18 in the wall segment 10 adjacent the bottom of the pool.

Within the filter casing and above the pump 14 is positioned a filter chamber 20 having a concave bottom and in which are mounted hollow filter discs 22 opening at the center into a manifold 24 connected by a pipe 26 to the pump inlet 28.

Above the filter chamber in casing 12 is located a second chamber 30 which is connected to the pool interior by an opening 32 through the wall segment 10. The opening 32 is closed by a bottom hinged float valve 34 in a conventional manner. The bottom of the chamber 30 has a depression 36 therein in which is placed a basket filter 38 for filtering coarse material. A conduit 40 is connected to the bottom of depression 36 and leads the water sucked in by the pump 14 along one wall of the filter chamber towards the concave bottom of the filter chamber so as to cause a turbulence flow preventing any accumulation of filter powder at the bottom of the filter casing, thereby causing the filter powder to move towards the surface of discs 22.

Access to chamber 30 is through a removable top cover 42. Chamber 30 is separated from filter chamber 32 by a plate 44 which is also removable to permit access to filter chamber 20.

Filter chamber 20 is provided with a drain tube 46 which may be closed by folding the tube on itself and locking it in position by a spring clip 48.

Access to the pump 14 and to the drain tube 46 at the bottom of casing 12 is through a door 50.

Although the invention has been disclosed with reference to a particular embodiment thereof, it is to be understood that various modifications of such embodiment may be envisaged within the scope of the invention.

We claim:

1. A filter assembly for a swimming pool made of wall segments assembled edge to edge to form the wall of the pool, comprising:
   a. a casing integral with one of said wall segments and located on the outside wall of the one segment;
   b. a filter chamber in said casing and communicating with the pool interior adjacent the surface of the water in the pool;
   c. a filter located in said filter chamber;
   d. a pump located in said casing outside the said filter chamber and communicating with said filter and with the pool interior adjacent to the bottom thereof for recirculating the water in the pool from the top of the pool, through the filter and towards the bottom of the pool;
   e. means defining a second chamber in said casing on top of said filter chamber and connected directly to the pool through an opening in said segment;
   f. wherein said chamber has a depression formed therein and comprising a basket filter in said depression for collecting the coarse material in the pool, and
   g. wherein said filter chamber has a concave bottom, said filter assembly further comprising a conduit in communication with said depression of said second chamber and extending along one wall of said filter chamber towards the concave bottom of said filter chamber for creating a turbulence flow in said filter chamber to prevent the filter powder of the filter to deposit at the bottom of the filter chamber.

2. A filter assembly as defined in claim 1, wherein the opening in said one segment is closed by a bottom hinged float valve.

3. A filter assembly as defined in claim 1, wherein said filter includes a plurality of filter discs opening at the center into a manifold connected to the pump inlet, and wherein the filter powder under the turbulence effect of said conduit is directed towards the surface of said discs.

4. A filter assembly as defined in claim 1, wherein the filter chamber has a drain tube for permitting cleaning of the filter chamber.

5. A filter assembly as defined in claim 1, wherein said second chamber is separated from said filter chamber by a removable plate permitting access to the filter chamber.

6. A filter assembly as defined in claim 1, wherein said pump is located below said filter chamber, and further comprising a removable door in said casing giving access to said pump.

* * * * *